(12) United States Patent
Neatherway et al.

(10) Patent No.: US 10,303,469 B1
(45) Date of Patent: May 28, 2019

(54) COMMIT GRAPH GENERATION

(71) Applicant: Semmle Limited, Oxford (GB)

(72) Inventors: Robin Neatherway, Oxford (GB); Arthur Baars, Oxford (GB); Sebastian Bauersfeld, Oxford (GB)

(73) Assignee: Semmle Limited, Oxford (GB)

( * ) Notice: Subject to any disclaimer, the term of this patent is extended or adjusted under 35 U.S.C. 154(b) by 0 days.

(21) Appl. No.: 15/857,278

(22) Filed: Dec. 28, 2017

(51) Int. Cl.
| | | |
|---|---|---|
| *G06F 9/44* | (2018.01) | |
| *G06F 17/30* | (2006.01) | |
| *G06F 9/45* | (2006.01) | |
| *G06F 11/36* | (2006.01) | |
| *G06F 8/77* | (2018.01) | |
| *G06F 8/71* | (2018.01) | |

(52) U.S. Cl.
CPC ............... *G06F 8/77* (2013.01); *G06F 8/71* (2013.01); *G06F 17/30958* (2013.01)

(58) Field of Classification Search
CPC ... G06F 8/71; G06F 8/75; G06F 8/433; G06F 8/77; G06F 11/3616; G06F 17/30368; G06F 17/30958; G06F 17/30327; G06F 8/30; G06F 8/24; G06F 17/30371; G06F 21/6218
See application file for complete search history.

(56) References Cited

U.S. PATENT DOCUMENTS

| | | | | |
|---|---|---|---|---|
| 8,645,929 | B2* | 2/2014 | Chamieh | G06F 8/41 717/139 |
| 9,471,304 | B1* | 10/2016 | Fuchs | G06F 8/71 |
| 9,600,273 | B2* | 3/2017 | Neubeck | G06F 8/73 |
| 9,798,648 | B2* | 10/2017 | Henriksen | G06F 11/3604 |
| 9,892,185 | B2* | 2/2018 | Bruening | G06F 17/30581 |
| 2008/0189679 | A1* | 8/2008 | Rodriguez | G06F 8/34 717/105 |
| 2014/0297592 | A1* | 10/2014 | Ohtake | G06F 17/30309 707/638 |
| 2018/0084086 | A1* | 3/2018 | Newman | H04L 41/0893 |
| 2018/0150294 | A1* | 5/2018 | Phillips | G06F 8/71 |

OTHER PUBLICATIONS

Tsutsumi et al., Graph-based approach for detecting impure refactoring from version commits, 4 pages (Year: 2016).*
Agrawal et al. Commit quality in five high performance computing projects, 6 pages (Year: 2015).*

* cited by examiner

*Primary Examiner* — Thuy Dao
(74) *Attorney, Agent, or Firm* — Fish & Richardson P.C.

(57) ABSTRACT

Methods, systems, and apparatus, including computer programs encoded on computer storage media, for generating a commit graph for a software project maintained in a version control system having a directory-based branching structure. One of the methods includes receiving data representing a commit history of a software project maintained in a version control system having a directory-based branching system in which each branch of the commit history has a respective branch directory and each revision is identified by a branch path and a revision number. The commit history is traced backward in time from a starting commit of a branch to identify an initial commit in which a branch directory for the branch was created. The commit history is then processed forward in time from the initial commit to generate a tree-structured commit graph.

19 Claims, 7 Drawing Sheets

COMMIT GRAPH GENERATION

BACKGROUND

This specification relates to static analysis of computer software source code.

Static analysis refers to techniques for analyzing computer software source code without executing the source code as a computer software program.

Source code is typically maintained by developers in a code base of source code using a version control system. Version control systems generally maintain multiple revisions of the source code in the code base, each revision being referred to as a snapshot. Each snapshot is a representation of the source code of the code base as the source code existed at a particular point in time. A snapshot may be thought of as including all the source code as of a particular point in time, although all the source code need not be explicitly stored for every snapshot.

Snapshots stored in a version control system can be represented as a directed, acyclical commit graph. Each node in the commit graph represents a commit of the source code. A commit represents a snapshot as well as other pertinent information about the snapshot such as the author of the snapshot, and data about ancestor commits of the node in the commit graph. A directed edge from a first node to a second node in the commit graph indicates that a commit represented by the first node is a previous commit than a commit represented by the second node, and that no intervening commits exist in the version control system.

Branching is the process of making a copy of a source snapshot of the code base that is subsequently developed independently of the source snapshot. Thus, subsequent modifications on the new branch do not affect later commits on the previous branch. Merging is the process of incorporating two branches into a single branch. Branching and merging processes allow parallel development to occur along multiple versions of the code base. The developed features can then be merged back together at a later time. Developers working in parallel on different branches can create new features in the branches.

Aspects of static analysis include attributing source code contributions using a commit graph. Attributing source code contributions means attributing, to a developer entity responsible for a snapshot, changes introduced by the snapshot relative to a previous snapshot. A developer entity can be a single developer or a group of multiple developers. For example, a developer entity can be a lone developer, developers on a team, developers within a department of an organization, or any other appropriate group of developers.

Some version control systems use a directory-based branching system rather than a graph-based branching system. One such example is Apache Subversion. In a directory-based branching system, no revision graph is explicitly maintained. Rather, each branch is identified by a branch path, e.g., a path in a file system to a branch directory, and each revision is identified by a branch path and a revision number. Typically, the revision numbers across all revisions in a project are updated incrementally.

New branches can be created by creating a copy of a working directory for a snapshot. Often the new copy will have a name that conforms to a particular naming convention enforced by an organization. Thus, given a particular naming convention, some prior art software tools can generate a commit graph for a project that is maintained by a directory-based version control system.

However, such naming practices are merely organization-enforced conventions, and thus, many exceptions and unusual circumstances abound in practice. For example, many software projects often go through naming convention changes throughout their lifetimes. This can happen, for example, due to a change in organization practices, a change in management or ownership, a change in industry practice, or a change to the underlying version control system. Therefore, in any sufficiently large or sufficiently old software project, a naming convention change at some point in its history is likely to have occurred. In addition, enforcement can simply be haphazard or nonexistent. Thus, not all software projects adhere to such naming conventions even when they are present.

Therefore, in general it is not possible with prior art software tools to automatically construct a commit graph for a project maintained in a directory-based version control system. Rather, the commit graph must be constructed piecemeal by manually and painstakingly deciphering all the old naming conventions, or lack thereof, used in the software project.

However, these kinds of manual processes to construct a commit graph are unsuitable for a static analysis system that seeks to automatically analyze thousands or tens of thousands of software projects.

SUMMARY

This specification describes how a system can generate a commit graph for a software project maintained in a directory-based version control system. After the commit graph is generated, a source code analysis system can perform analysis and attribution of source code contributions to the software project.

Particular embodiments of the subject matter described in this specification can be implemented so as to realize one or more of the following advantages. A source code analysis system can generate a commit graph from a software project that is maintained in a directory-based version control system. Generating a commit graph is advantageous because it allows a system to treat directory-based version control systems uniformly alongside graph-based version control systems. The system can perform inline recovery of merge commit information, which avoids the large performance hit when communicating with a version control system to determine which commits are merge commits. This results in more recent and potentially more relevant analysis results being generated sooner in the process. And, when all merge commit information is not necessary, results in a faster analysis process overall.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
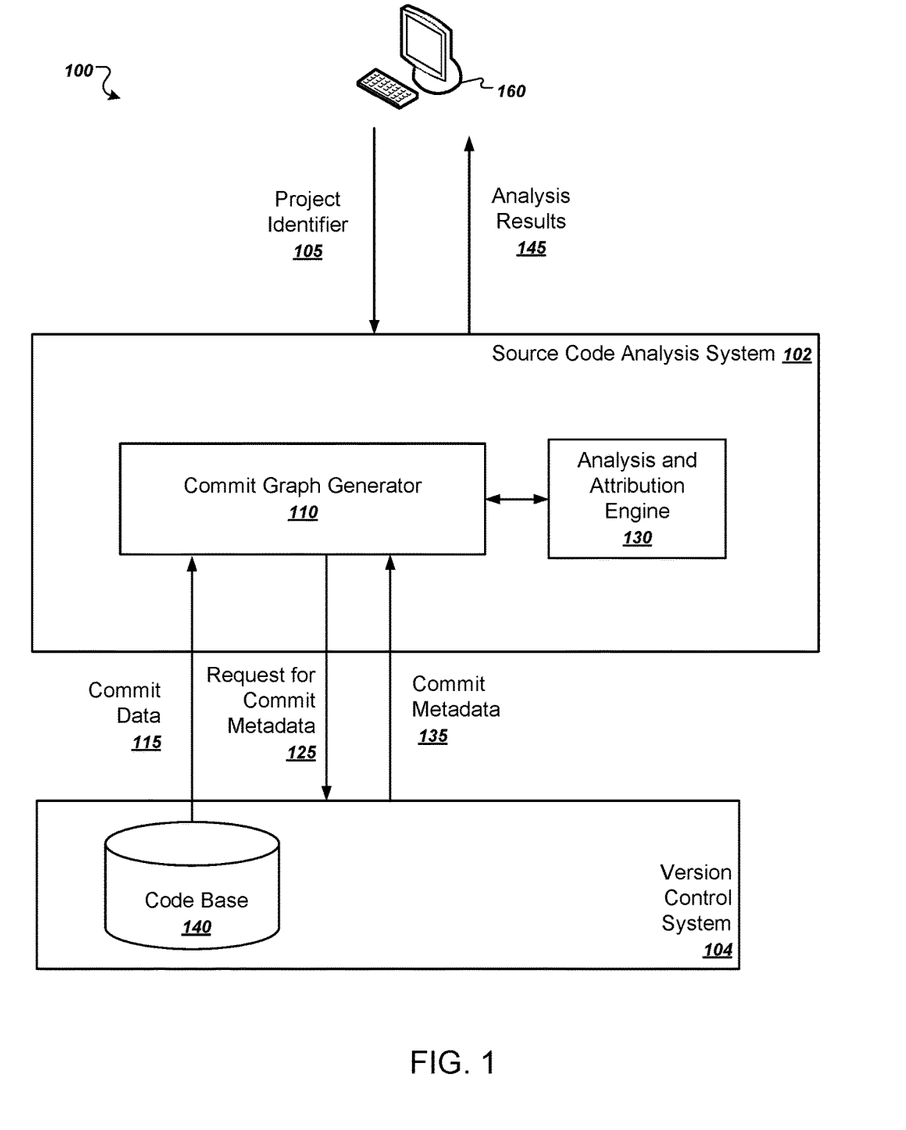
FIG. 1 is a diagram that illustrates an example system.

FIG. 1 is a diagram that illustrates an example system 100. The system 100 includes a user device 160 in communication with a source code analysis system 102 over a network, which can be any appropriate communications network. The system 100 is an example of a system in which a source code analysis system 102 automatically generates a commit graph for a software project maintained in a directory-based version control system 104.

The source code analysis system 102 includes a commit graph generator 110, and an analysis and attribution engine 130. The components of the source code analysis system 102 can be implemented as computer programs installed on one or more computers in one or more locations that are coupled to each through a network. Alternatively, the source code analysis system 102 can be installed in whole or in part on a single computing device, e.g., the user device 160.

The source code analysis system 102 can communication with a version control system 104. The version control system 104 is typically hosted by a computing system that is distinct from, and possibly also remote from, the user device 160 and the source code analysis system 102. For example, the source code analysis system 102 can communicate with the version control system 104 over a network, e.g., the Internet. The version control system 104 maintains a code base 140 with a directory-based branching structure.

The version control system 104 also maintains commit metadata 115 representing various properties of commits in the code base 140. The commit metadata 115 indicates, among other things, whether or not a particular commit to the code was a merge commit between two or more other commits.

A user of the user device 160 can provide a project identifier 105 of a software project to the source code analysis system 102. The project identifier 105 is part of an explicit or implicit request to automatically analyze the software project. Part of the analysis process can include attribution source code contributions to a responsible developer entity, in which case the source code analysis system 102 can generate a commit graph for the project.

In order to generate the commit graph, the commit graph generator 110 can receive commit data 115 from the version control system. In a version control system with directory-based branching, the commit data can uniquely identify a commit by its branch path and a revision number. The commit graph generator 110 can then generate an initial commit graph without merge commits by finding an origin commit and building a tree-structured commit graph. These processes are described in more detail below with reference to FIGS. 2-4.

After generating the tree-structured commit graph, the analysis and attribution engine 130 can begin analyzing commits in the project. This process may involve extracting source code by instrumenting a build system and performing an instrumented build of source code in the commit by performing an instrumented build of the commit. Suitable techniques for instrumenting a build system are described in more detail in U.S. Pat. Nos. 9,110,737 and 9,489,182, which are herein incorporated by reference in their entirety.

Regardless of how the source code is extracted, the analysis and attribution engine 130 can generate various source code metrics from the extracted source code, which can then be reported back to the user device 160 as analysis results 145. The analysis results 145 can represent any appropriate source code analysis results, e.g., attributions of source code contributions, values of various source code metrics, and visual representations of large scale trends in the code base 140.

Notably, the analysis and attribution engine 130 can begin reporting analysis results 145 back to the user device before any merge commit information is obtained from the version control system 104. This makes the entire system more responsive to the end user, which is useful because often end users are most interested in analysis results for the most recently committed snapshots to the code base rather than snapshots that were committed long ago.

While performing analysis tasks, the analysis and attribution engine 130 can perform inline recovery of merge commit information. This means that before or shortly after starting an analysis task, which as mentioned above can involve building the commit, the analysis and attribution engine 130 can communicate with the commit graph generator 110 to determine whether the commit that is currently being analyzed is a merge commit. If so, the analysis and attribution engine 130 can perform special handling for merge commits.

The commit graph generator 110 can provide a request for commit metadata 125 to the version control system 104. The request 125 can specify one or more commits and may also specify that merge commit information specifically is requested. In response, the version control system 104 can provide the commit metadata 135 for the one or more commits, which can indicate, for each commit, whether the commit is a merge commit.

The commit graph generator 110 can then communicate the commit metadata 135 to the analysis and attribution engine 130, which may have already started the analysis process. If the process has already started, the analysis and attribution engine can restart or modify the process to include merge commit handling. Because merge commits are fairly rare, the analysis and attribution engine 130 can save time by starting the process assuming that the commit is not a merge commit. And because the analysis process is typically time-intensive, particularly when an instrumented build is required, the time required to communicate with the version control system 104 in order to determine whether or not a commit is a merge commit, which is usually on the order of a second or two, is relatively tiny. Without this inline recovery of merge commits, it could take several hours of communicating with the version control system just to discover the merge commit information.

Figure 2:
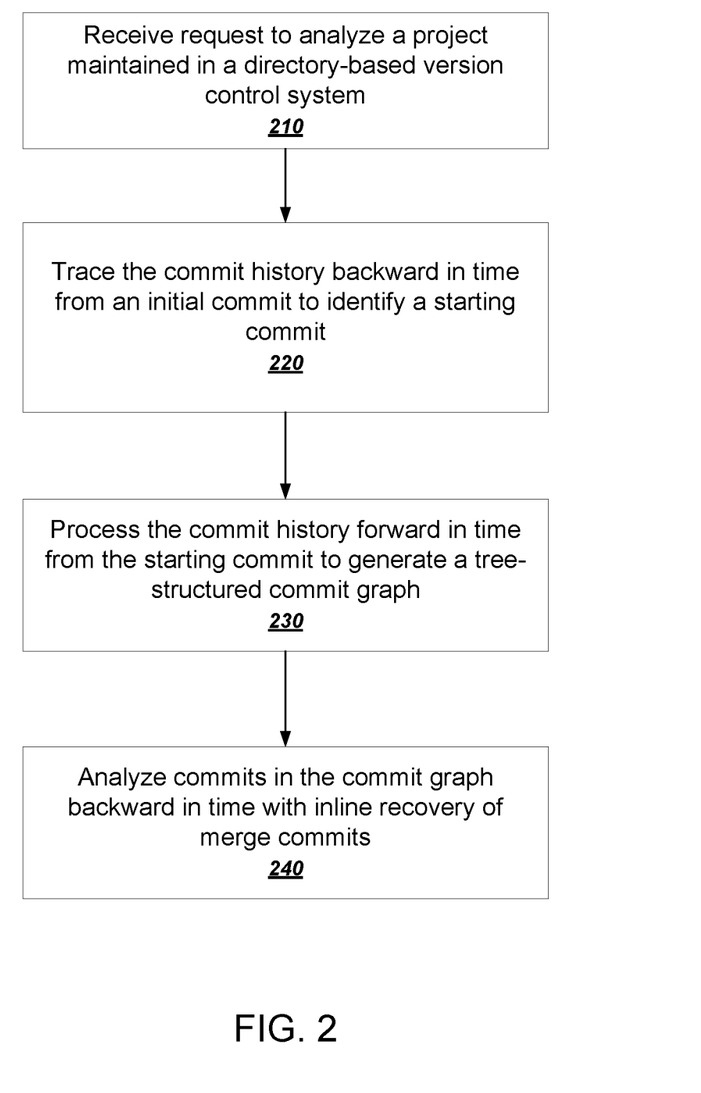
FIG. 2 is a flowchart of an example process for analyzing a project maintained in a directory-based version control system.

FIG. 2 is a flowchart of an example process for analyzing a project maintained in a directory-based version control system. For convenience, the process will be described as being performed by a system of one or more computers, located in one or more locations, and programmed appropriately in accordance with this specification. For example, a source code analysis system, e.g., the source code analysis system 102 of FIG. 1, appropriately programmed, can perform the process.

The system receives a request to analyze a project maintained in a directory-based version control system (210). The request can originate from user input that explicitly identifies the project. The system can also automatically select the project as part of a process to automatically analyze many different software projects.

The system traces the commit history of the project backward in time from an initial commit to identify a starting commit (220). In order to obtain an accurate analysis picture of the project, the system will seek to trace the commit history sufficiently far back. In some implementations, this corresponds to a starting commit in which a branch directory was initially created. In some other implementations, the system traces the commit history backward only up to a predefined number of commits or a predefined period of time.

As described above, the naming conventions can change or be disregarded ad hoc for a project maintained in a directory-based version control system. Therefore, the system needs to implement a process that automatically traces the commit history backwards through possibly multiple different branch directory paths. One such process for tracing the commit history backward through multiple branch directory paths is described below with reference to FIG. 4.

Figure 3A:
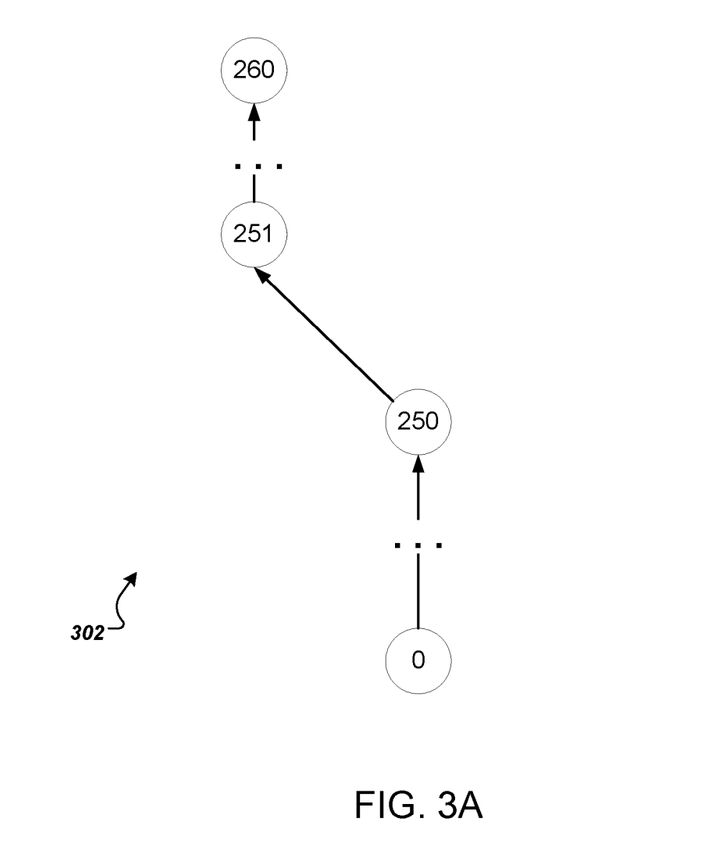
FIG. 3A illustrates an example recreated revision graph.

FIG. 3A illustrates an example recreated revision graph 302 for an example project. In this example, the initial commit was commit 260. The numbering of the commits for this and other examples in this specification can indicate a revision number for the commit in a directory-based version control system. As described above, a particular commit can be uniquely identified by a branch directory path and a revision number.

In FIG. 3A, a number of commits 251-260 exist for a first branch directory. In the figures, an ellipsis indicates that there may be other commits in the same branch directory path that are not explicitly represented in the figures. An ellipsis on an edge for a particular branch directory path may, but need not, indicate that every possible enumerated revision number exists in that branch directory path.

Between commits 250 and 251, the branch directory path changed. This can occur, for example, when a developer moves or renames the branch directory for a particular commit. In the examples in this specification, an angled arrow will represent a change to the branch directory path.

Thus, when tracing the commit history backward, the system needs to implement a process that can trace changes to the branch directory path, e.g., as would occur between commits 250 and 251.

A number of commits 250-0 then occur in the same branch directory path without another change. Commit 0 corresponds to a commit in which the branch directory was created, so the system can designate commit 0 as a starting commit.

As shown in FIG. 2, the system processes the commit history forward in time from the starting commit to generate a tree-structured commit graph (230). Although the initial process of tracing the commit history backward can follow just a single path, the system can follow multiple paths when generating the tree-structured commit graph. This is because the system can follow all changes to the branch directory path throughout time rather than just changes that eventually affected the initial commit.

Note that because tracing the commit history backward in time already retraced part of the tree-structured graph, in some implementations, the system reuses that work and starts from an initial tree-structured graph created from that process. For example, instead of starting from scratch, the system can start with the tree-structured graph illustrated in FIG. 3A.

After following all changes to the branch directory path forward in time, the system will have a tree-structured commit graph. Notably, because the graph is tree-structured, the graph will lack any information about merge commits. In other words, once a new branch is created, the commits on that branch never rejoin any other branches.

Figure 3B:
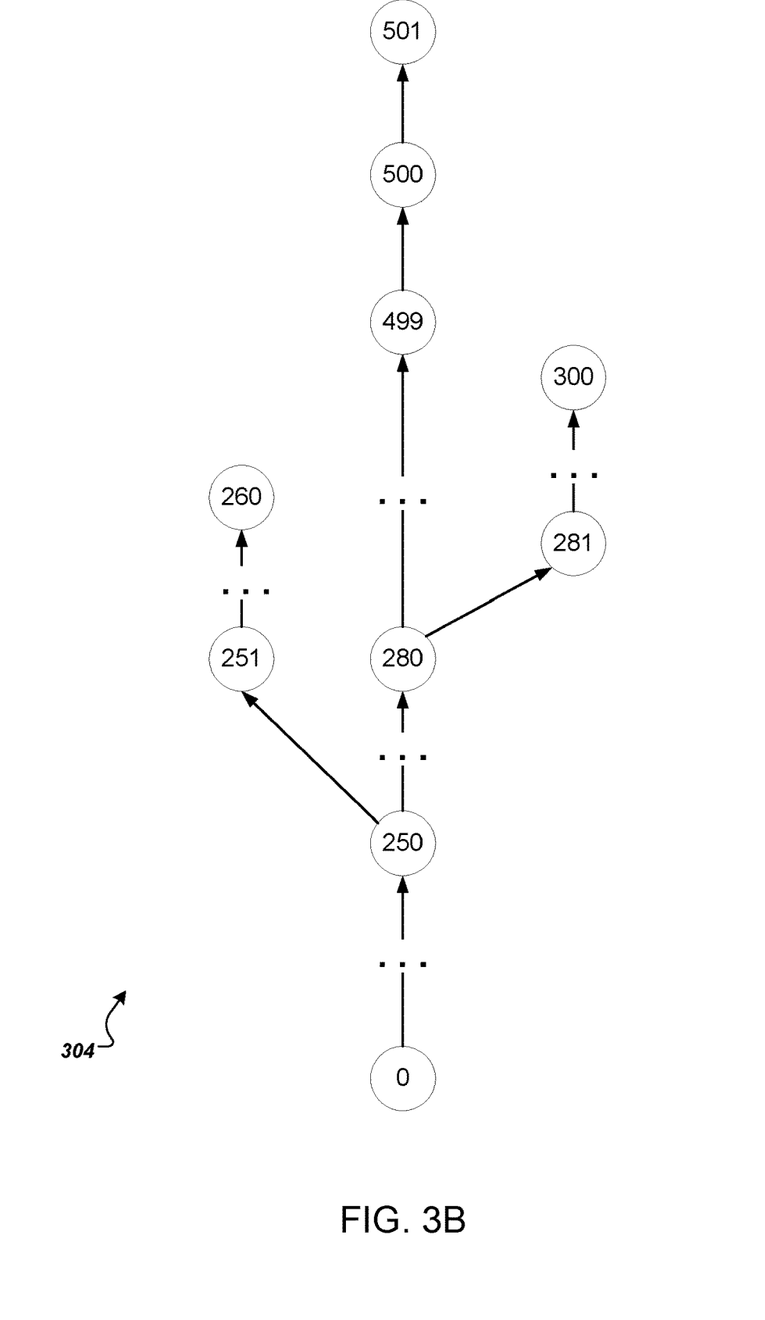
FIG. 3B illustrates an example tree-structured commit graph.

FIG. 3B illustrates an example tree-structured commit graph 304. The example in FIG. 3B assumes the starting commit designated from FIG. 3A as a starting point.

Thus, in addition to commits 0-260, the graph 304 also includes commits 280, 281-300, and 499, 500, and 501. As described above, the ellipsis between revisions 280 and 499 having the same branch directory indicates that other revisions that are not explicitly represented in FIG. 3B may exist in the same branch directory path. But the ellipsis does not mean that every revision number between 280 and 499 exists in that branch directory path.

FIG. 3B illustrates that the graph 304 has a main branch, which may be referred to as a trunk, including commits 0-250, 250-280, and 499-501. Which branch is considered the main branch is dependent upon the context. In this example, the main branch is characterized as having the most recent commit 501. The graph 304 also has two secondary branches: a first secondary branch having commits 251-260 and a second secondary branch having commits 281-300.

As shown in FIG. 2, the system analyzes commits in the commit graph backward in time with inline recovery of merge commits (240). After generating the tree-structured revision graph, the system can begin analyzing the commits backward in time.

Some directory-based version control systems can be queried for metadata that can indicate whether or not a particular commit is a merge commit. The version control system can respond with metadata that indicates, among other things, whether the commit is a merge commit or not and which other commits should be considered parent commits of the commit.

However, round-trip query time for such a request can, in practice, take 1 second or more. For very large projects, e.g., projects having 100,000 commits, it is simply not feasible to query the version control system up front to fully recreate the commit graph before beginning analysis of the commits.

Instead, the system can perform the queries for merge commit information inline with performing analysis of the commits. This approach is far more suitable for large scale static analysis for a variety of reasons. First, the entire commit graph does not need to be reconstructed for results to start appearing. Second, the time required to query the version control system for merge commit information is tiny compared to the time required to perform analysis on a commit.

Therefore, while querying for merge commit information has a drastic effect on reconstructing the commit graph, performing inline analysis has only a negligible effect on analyzing the commits.

Thus, in this context, inline recovery of merge commits means that when a particular commit is being analyzed, the system queries the version control system for merge commit information. The process is inline with the analysis because the system starts performing the analysis before the entire commit graph is reconstructed. In other words, the system begins performing analysis using only a partially completed commit graph, which is nevertheless sufficiently complete from the perspective of the current commit.

If the commit is a merge commit, special handling is required. In particular, in order to determine whether a source code contribution has been committed by a developer entity responsible for the commit, all parent commits of the commit must be analyzed first. Thus, the system can abort analysis for a commit if the version control system indicates that the current commit is a merge commit and not all parent commits have been analyzed.

As one example, the system can attribute a violation introduction for a violation in the merge commit only if the violation matches no violations in any of the parent snapshots. As another example, the system can attribute a violation removal for a violation in the merge commit only if the violation matches a violation in every parent snapshot. Other suitable techniques for attributing source code contributions for merge commits are described in commonly-owned U.S. Pat. No. 9,262,157, entitled "Source Code Violation Matching and Attribution," which is herein incorporated by reference.

Alternatively, the system can simply ignore the contributions in merge commits. Alternatively or in addition, the system can ignore the contributions in merge commits except for contributions that relate to resolving conflicting changes between multiple parent commits.

If the commit is not a merge commit, the system can analyze the commit as usual, including attributing source code contributions by comparing the commit to its parent commit in the commit graph.

Figure 3C:
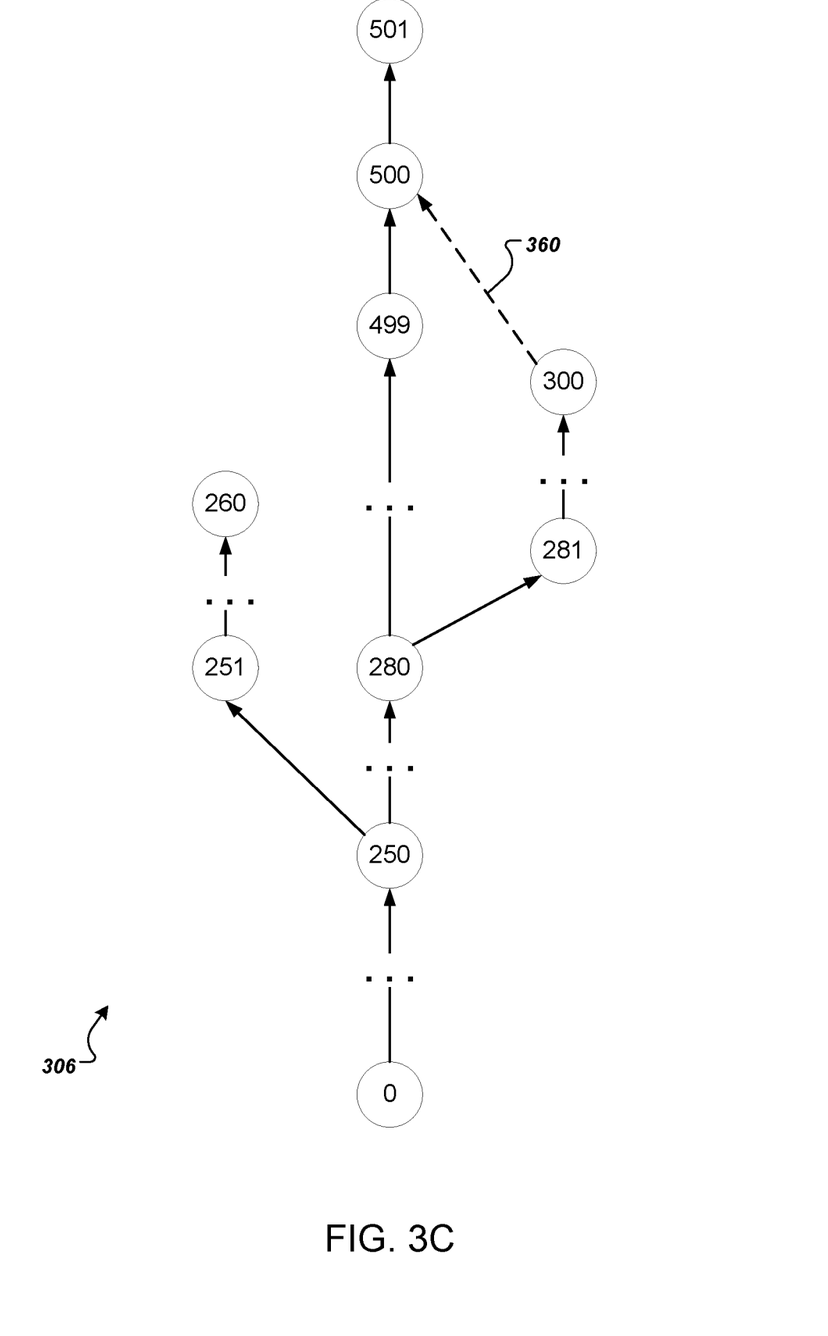
FIG. 3C illustrates a recovered edge representing a merge commit.

FIG. 3C illustrates a recovered edge 360 representing a merge commit. The graph 306 in FIG. 3C has all the nodes and edges from the graph 304 in FIG. 3B. However, in the course of analyzing the commits in the graph 306, the system can recover merge commits inline. Thus, the system can begin analyzing the most-recent commit 501, and then the commit 500.

When analyzing the commit 500, the system can query the version control system to determine which other commits should be considered parent commits. In this example, the version control system indicates that both commit 499 and commit 300 should be considered parent commits. Therefore, the commit 500 is a merge commit that the system should not analyze until both the commit 499 and the commit 300 are analyzed.

The system can thus generate a recovered edge 360 in the graph 306 representing the recovered merge commit information.

Figure 3D:
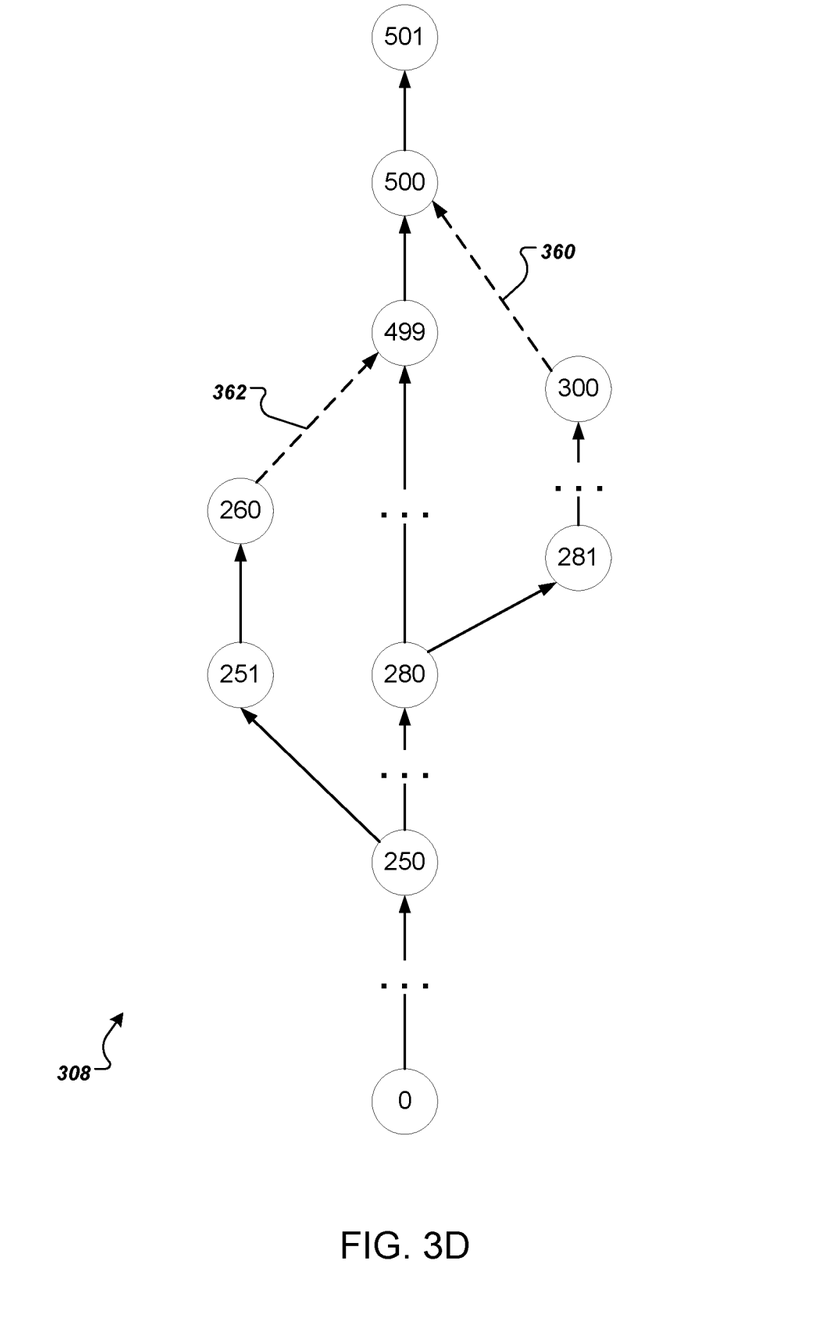
FIG. 3D illustrates another recovered edge representing a second merge commit.

FIG. 3D illustrates another recovered edge 362 representing a second merge commit. In this example, the version control system can indicate that the commit 499 is a merge commit between the commit 260 and another commit that is a parent of the commit 499 having the same branch directory path.

Thus, the system can generate a recovered edge 362 in the graph 308 representing the recovered merge commit information.

Therefore, the system can analyze merge commits 499 and 500 in the graph 308 differently than other non-merge commits in the graph 308.

Figure 4:
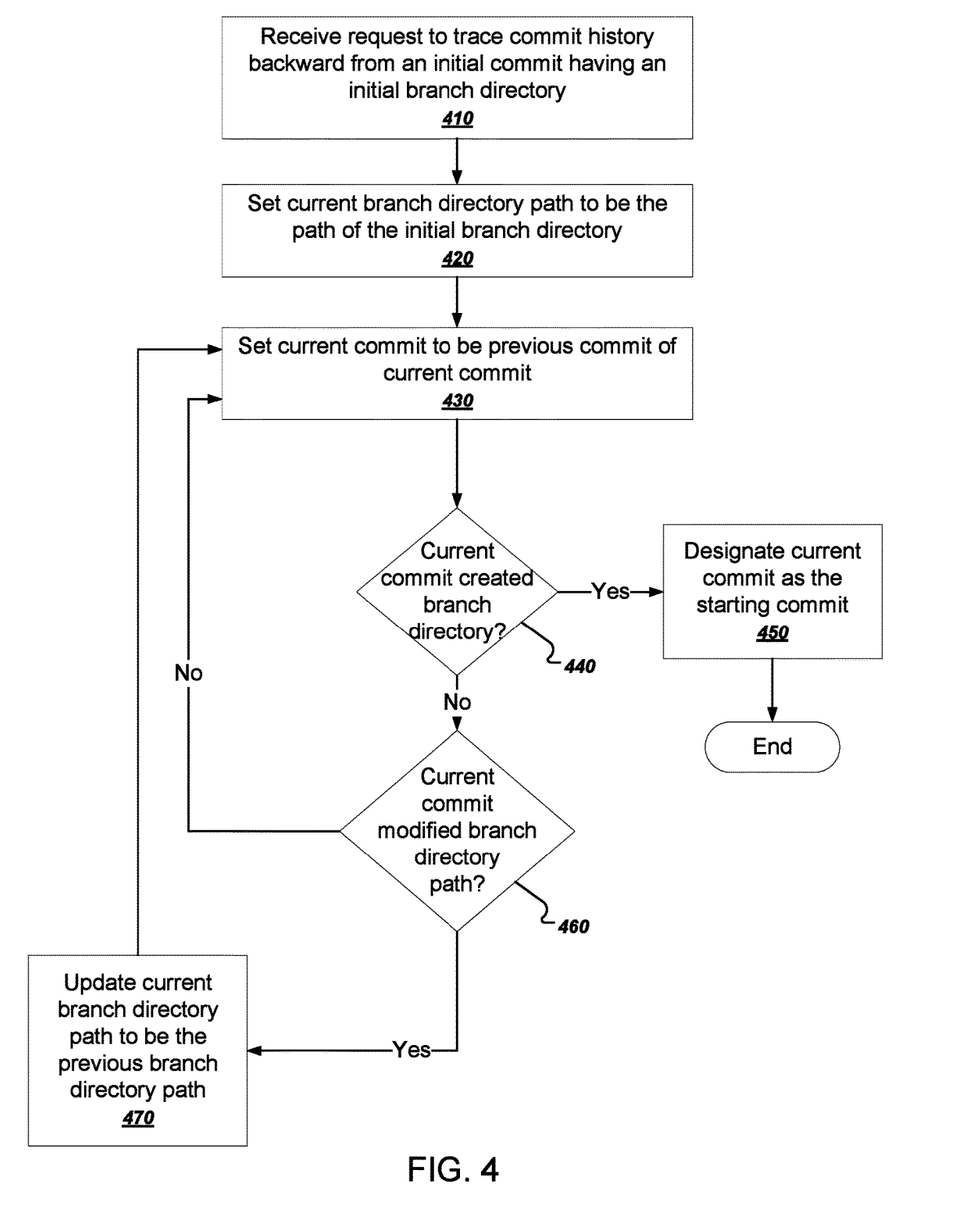
FIG. 4 is a flowchart of an example process for tracing the commit history backward in time to identify a starting commit.

FIG. 4 is a flowchart of an example process for tracing the commit history backward in time to identify a starting commit. For convenience, the process will be described as being performed by a system of one or more computers, located in one or more locations, and programmed appropriately in accordance with this specification. For example, a source code analysis system, e.g., the source code analysis system 102 of FIG. 1, appropriately programmed, can perform the process.

The system receives a request to trace the commit history backward from an initial commit having an initial branch directory (410).

The system sets a current branch directory path to be the path of the initial branch directory (420). Throughout the process the system can maintain a current branch directory for a current branch.

The system sets a current commit to be a previous commit of the current commit (430). In other words, the system traces the commit history one step backward by updating the current commit to the parent commit of the current commit. Note that merge commits need not be considered at this stage.

The system determines whether the current commit created the current branch directory (440). If so, the system designates the current commit as the starting commit (branch to 450) and the process ends. In other words, the system can designate the current commit as the starting commit if it was the commit that initially created the current branch directory.

If not, the system determines whether the current commit modified the branch directory path (460). A commit can modify a branch directory path when the branch directory is renamed or moved.

If the current commit modified the branch directory path (460), the system updates the current branch directory path to be the previous branch directory path (branch to 470). The system then again updates the current commit (430).

If the current commit did not modify the branch directory path (460), the system simply again updates the current commit (branch to 430).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
one or more computers and one or more storage devices storing instructions that are operable, when executed by the one or more computers, to cause the one or more computers to perform operations comprising:

receiving data representing a commit history of a software project maintained in a version control system having a directory-based branching system in which each branch of the commit history has a respective branch directory and each revision is identified by a branch path and a revision number;

tracing the commit history backward in time from a starting commit of a branch to identify an initial commit in which a branch directory for the branch was created; and processing the commit history forward in time from the initial commit to generate a tree-structured commit graph.

Embodiment 2 is the method of embodiment 1, further comprising:

processing a plurality of commits in the tree-structured revision graph backward in time, including:

determining whether a current commit is a merge commit having multiple parent commits;

whenever the current commit is not a merge commit, attributing one or more characteristic segments of source code to a developer entity responsible for the current commit based on comparing the characteristic segments of source code to a parent commit of the merge commit in the tree-structured revision graph;

whenever the commit is a merge commit having multiple parent commits, performing an attribution process specific to merge commits including analyzing all of the multiple parent commits before performing an attribution process for the current commit.

Embodiment 3 is the method of embodiment 2, wherein performing the attribution process specific to merge commits comprises ignoring source code contributions in the merge commit.

Embodiment 4 is the method of embodiment 2, wherein performing the attribution process specific to merge commits comprises attributing only conflict resolutions to the developer entity.

Embodiment 5 is the method of embodiment 2, wherein determining whether the current commit is a merge commit comprises:

providing a request to a version control system for information on the current commit;

receiving a response from the version control system including metadata for the current commit; and determining whether the metadata indicates that the current commit is a merge commit.

Embodiment 6 is the method of embodiment 5, further comprising determining whether the current commit is a merge commit inline with analyzing the current commit.

Embodiment 7 is the method of embodiment 2, wherein analyzing a commit comprises performing an instrumented build of the source code, extracting source code during the instrumented build, and identifying source code violations in the extracted source code.

Embodiment 8 is the method of embodiment 7, further comprising starting analysis of each commit before querying a version control system for merge commit information.

Embodiment 9 is the method of any one of embodiments 1-8, wherein tracing the commit history backward in time from a starting commit of a branch to identify an initial commit in which a branch directory for the branch was created comprises:

setting a branch directory of the starting commit as a current branch directory and the starting commit as a current commit, and performing operations comprising:

updating a predecessor commit of the branch directory to be the current commit;

determining whether the current commit changed the branch directory path for the current branch;

whenever the current commit changed the branch directory path for the current branch, updating the branch directory for the current branch with a previous branch directory before the change to the branch directory path, until encountering an initial commit in which the current branch directory was created.

Embodiment 10 is the method of embodiment 9, wherein a change to the branch directory path comprises a renamed branch directory or a moved branch directory.

Embodiment 11 is the method of any one of embodiments 1-10, wherein the starting commit is a most recent commit of the software project.

Embodiment 12 is a system comprising: one or more computers and one or more storage devices storing instructions that are operable, when executed by the one or more computers, to cause the one or more computers to perform the method of any one of embodiments 1 to 11.

Embodiment 13 is a computer storage medium encoded with a computer program, the program comprising instructions that are operable, when executed by data processing apparatus, to cause the data processing apparatus to perform the method of any one of embodiments 1 to 11.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A system comprising:
one or more computers and one or more storage devices storing instructions that are operable, when executed by the one or more computers, to cause the one or more computers to perform operations comprising:
receiving data representing a commit history of a software project maintained in a version control system having a directory-based branching system in which each branch of the commit history has a respective branch directory and each revision is identified by a branch path and a revision number;
tracing the commit history backward in time from a starting commit of a branch to identify an initial commit in which a branch directory for the branch was created;
processing the commit history forward in time from the initial commit to generate a tree-structured commit graph; and
processing a plurality of commits in the tree-structured commit graph backward in time, including:
determining whether a current commit is a merge commit having multiple parent commits;
whenever the current commit is not a merge commit, attributing one or more characteristic segments of source code to a developer entity responsible for the current commit based on comparing the characteristic segments of source code to a parent commit of the current commit in the tree-structured commit graph; and
whenever the commit is a merge commit having multiple parent commits, performing an attribution process specific to merge commits including analyzing all of the multiple parent commits before attributing characteristic segments of source code in the current commit.

2. The system of claim 1, wherein performing the attribution process specific to merge commits comprises ignoring source code contributions in the merge commit.

3. The system of claim 1, wherein performing the attribution process specific to merge commits comprises attributing, to a developer entity responsible for the merge commit, only resolutions of conflicts between the multiple parent commits of the merge commit.

4. The system of claim 1, wherein determining whether the current commit is a merge commit comprises:
providing a request to a version control system for information on the current commit;
receiving a response from the version control system including metadata for the current commit; and
determining whether the metadata indicates that the current commit is a merge commit.

5. The system of claim 4, wherein the operations further comprise determining whether the current commit is a merge commit inline with analyzing the current commit.

6. The system of claim 1, wherein analyzing a commit comprises performing an instrumented build of source code of the commit, extracting source code of the commit during the instrumented build, and identifying source code violations in the extracted source code.

7. The system of claim 6, wherein analyzing each commit comprises starting an analysis process on the commit before querying a version control system for merge commit information for the commit.

8. The system of claim 1, wherein tracing the commit history backward in time from a starting commit of a branch to identify an initial commit in which a branch directory for the branch was created comprises:
setting a branch directory of the starting commit as a current branch directory and the starting commit as a current commit; and
performing operations comprising the following operations until encountering an initial commit in which the current branch directory was created:
updating a predecessor commit of the branch directory to be the current commit; and then
determining whether the current commit changed a branch directory path for the current branch, and
whenever the current commit changed the branch directory path for the current branch, updating the branch directory for the current branch with a previous branch directory before the change to the branch directory path.

9. The system of claim 8, wherein a change to the branch directory path comprises a renamed branch directory or a moved branch directory.

10. The system of claim 1, wherein the starting commit is a most recent commit of the software project.

11. A computer-implemented method comprising:
receiving data representing a commit history of a software project maintained in a version control system having a directory-based branching system in which each branch of the commit history has a respective branch directory and each revision is identified by a branch path and a revision number;
tracing the commit history backward in time from a starting commit of a branch to identify an initial commit in which a branch directory for the branch was created;
processing the commit history forward in time from the initial commit to generate a tree-structured commit graph; and
processing a plurality of commits in the tree-structured commit graph backward in time, including:
determining whether a current commit is a merge commit having multiple parent commits;
whenever the current commit is not a merge commit, attributing one or more characteristic segments of source code to a developer entity responsible for the current commit based on comparing the characteristic segments of source code to a parent commit of the current commit in the tree-structured commit graph; and
whenever the commit is a merge commit having multiple parent commits, performing an attribution process specific to merge commits including analyzing all of the multiple parent commits before attributing characteristic segments of source code in the current commit.

12. The method of claim 11, wherein performing the attribution process specific to merge commits comprises ignoring source code contributions in the merge commit.

13. The method of claim 11, wherein performing the attribution process specific to merge commits comprises attributing, to a developer entity responsible for the merge commit, only resolutions of conflicts between the multiple parent commits of the merge commit.

14. The method of claim 11, wherein determining whether the current commit is a merge commit comprises:
providing a request to a version control system for information on the current commit;

receiving a response from the version control system including metadata for the current commit; and determining whether the metadata indicates that the current commit is a merge commit.

15. The method of claim 14, further comprising determining whether the current commit is a merge commit inline with analyzing the current commit.

16. The method of claim 11, wherein analyzing a commit comprises performing an instrumented build of source code of the commit, extracting source code of the commit during the instrumented build, and identifying source code violations in the extracted source code.

17. The method of claim 16, wherein analyzing each commit comprises starting an analysis process on the commit before querying a version control system for merge commit information for the commit.

18. The method of claim 11, wherein tracing the commit history backward in time from a starting commit of a branch to identify an initial commit in which a branch directory for the branch was created comprises:

setting a branch directory of the starting commit as a current branch directory and the starting commit as a current commit; and performing operations comprising the following operations until encountering an initial commit in which the current branch directory was created:

updating a predecessor commit of the branch directory to be the current commit; and then determining whether the current commit changed a branch directory path for the current branch, and whenever the current commit changed the branch directory path for the current branch, updating the branch directory for the current branch with a previous branch directory before the change to the branch directory path.

19. A computer program product, encoded on one or more non-transitory computer storage media, comprising instructions that, when executed by one or more computers, cause the one or more computers to perform operations comprising:

receiving data representing a commit history of a software project maintained in a version control system having a directory-based branching system in which each branch of the commit history has a respective branch directory and each revision is identified by a branch path and a revision number;

tracing the commit history backward in time from a starting commit of a branch to identify an initial commit in which a branch directory for the branch was created;

processing the commit history forward in time from the initial commit to generate a tree-structured commit graph; and processing a plurality of commits in the tree-structured commit graph backward in time, including:

determining whether a current commit is a merge commit having multiple parent commits;

whenever the current commit is not a merge commit, attributing one or more characteristic segments of source code to a developer entity responsible for the current commit based on comparing the characteristic segments of source code to a parent commit of the current commit in the tree-structured commit graph; and whenever the commit is a merge commit having multiple parent commits, performing an attribution process specific to merge commits including analyzing all of the multiple parent commits before attributing characteristic segments of source code in the current commit.

* * * * *